United States Patent
Schenk et al.

(10) Patent No.: US 9,548,792 B2
(45) Date of Patent: Jan. 17, 2017

(54) ADAPTIVE MONITORING OF CROSSTALK COUPLING STRENGTH

(75) Inventors: Heinrich Schenk, Munich (DE); Rainer Strobel, Ehingen (DE)

(73) Assignee: Lantiq Deutschland GmbH, Neubiberg (DE)

(*) Notice: Subject to any disclaimer, the term of this patent is extended or adjusted under 35 U.S.C. 154(b) by 405 days.

(21) Appl. No.: 13/597,965

(22) Filed: Aug. 29, 2012

(65) Prior Publication Data
US 2013/0229905 A1    Sep. 5, 2013

Related U.S. Application Data

(60) Provisional application No. 61/528,564, filed on Aug. 29, 2011.

(51) Int. Cl.
*H04B 3/32*  (2006.01)
*H04B 7/08*  (2006.01)

(52) U.S. Cl.
CPC ...................... *H04B 3/32* (2013.01)

(58) Field of Classification Search
CPC .................... H04B 3/32; H04B 3/464
USPC .................................... 370/201–208
See application file for complete search history.

(56) References Cited

U.S. PATENT DOCUMENTS

| | | | |
|---|---|---|---|
| 2010/0177838 A1* | 7/2010 | Schenk | 375/285 |
| 2011/0007623 A1* | 1/2011 | Cendrillon et al. | 370/201 |
| 2012/0020395 A1* | 1/2012 | Domanovitz et al. | 375/222 |
| 2012/0020418 A1* | 1/2012 | Sands et al. | 375/259 |
| 2013/0101094 A1* | 4/2013 | Peeters et al. | 379/28 |

* cited by examiner

*Primary Examiner* — Andrew Lai
*Assistant Examiner* — M Mostazir Rahman
(74) *Attorney, Agent, or Firm* — Eschweiler & Associates, LLC (57) ABSTRACT

The disclosure relates to a method of reducing crosstalk in a crosstalk cancelation system. The method comprises at least the steps of applying to the at least one first signal a crosstalk cancelation according to a set of crosstalk coefficients; monitoring crosstalk received in the at least one first signal at a first end of the first path during the application of the crosstalk cancelation; and updating the crosstalk coefficients during the monitoring. The disclosure also includes a device, which can carry out the method.

13 Claims, 4 Drawing Sheets

ADAPTIVE MONITORING OF CROSSTALK COUPLING STRENGTH

RELATED APPLICATION

This application claims the benefit of U.S. Provisional Application No. 61/528,564, filed Aug. 29, 2011. The entire contents of the Provisional Application are incorporated herein by reference.

BACKGROUND

For data transmission over a crosstalk limited channel, crosstalk cancelation techniques have been introduced to increase transmission performance. To reduce the computation effort for crosstalk cancelation, partial crosstalk cancelation may be used.

The selection of dominant crosstalk couplings is based on the coupling strength of every coupling path between the transmission lines. Spectrum balancing methods which reduce the transmission power of specific links to mitigate crosstalk also need information of the crosstalk coupling strength.

A crosstalk canceller has access to signals to perform crosstalk compensation or pre-compensation. The links may use multiple carrier frequencies for transmission. The receivers report a receiver error, the difference between a received signal and the corresponding symbol (slicer error). The receivers may be synchronized so that it is possible to define specific symbols which were received at all receivers synchronously.

Current methods for partial cancelation do a static selection that is based on an estimation of the transmission channel. The optimization of transmission powers (spectrum balancing) is also optimized based on a transmission channel estimate.

SUMMARY

In an aspect an embodiment encompasses updating the crosstalk strength metric such that, in operation, crosstalk cancelation may be performed taking into account a varying set of transmission channels. In a particular embodiment a crosstalk strength matrix may be subject to updating. In particular with a slowly time-varying transmission channel and changes in the quality requirements, the crosstalk strength metric may be updated in the running system. An initial estimation of the transmission channel may also contain estimation errors or measurement errors due to impulse noise which will be corrected in an adaptive update process.

Figure 1:
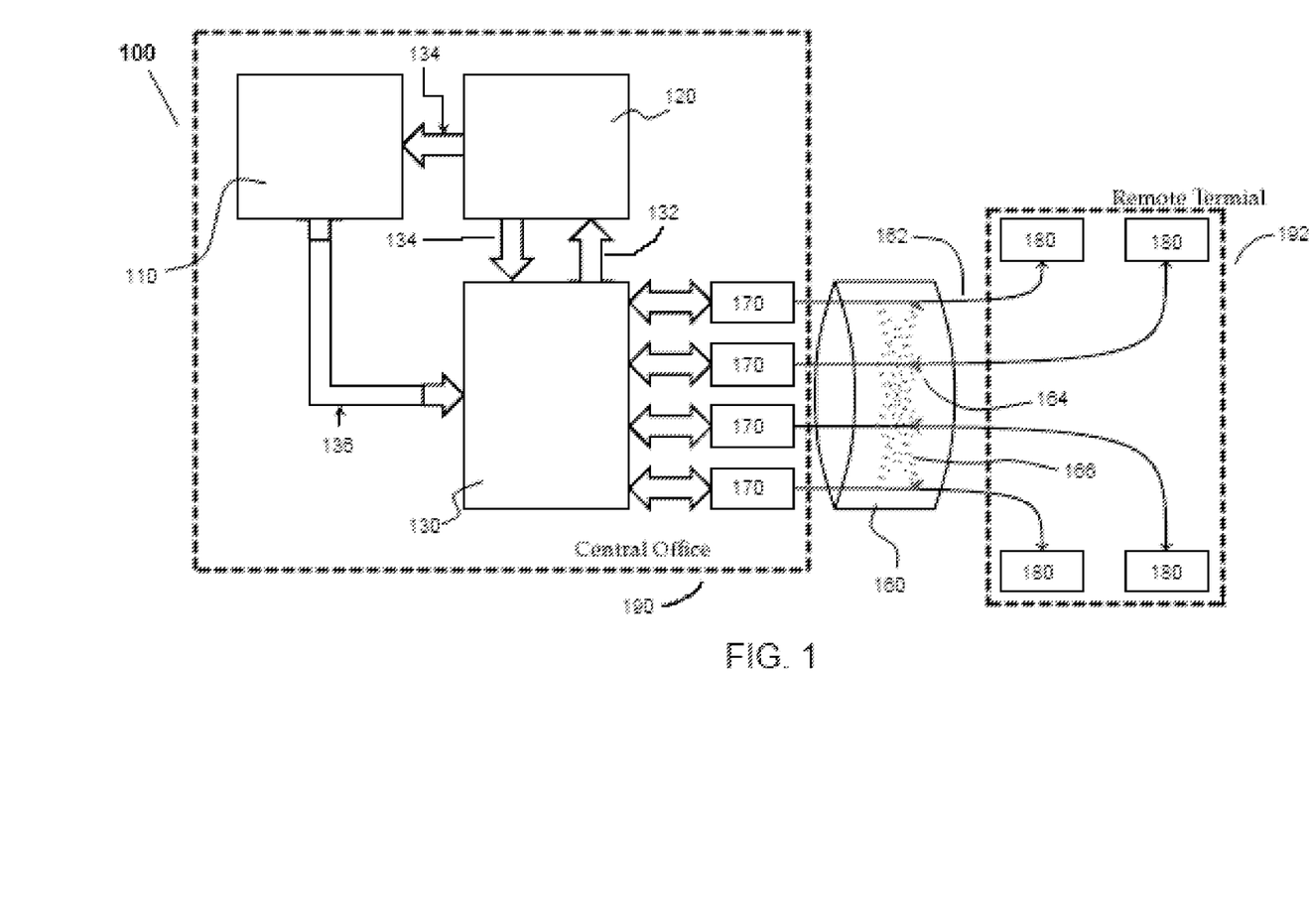
FIG. 1: Communication system with partial crosstalk cancelation and adaptive optimization of system settings

For a transmission system shown in FIG. 1, a component is suggested, which coordinates monitoring of the crosstalk strength metric. This gives the possibility to optimize settings like selection of crosstalk couplings for crosstalk to be canceled and, in one embodiment, selection of transmission powers while the system is in active state. Furthermore, in one embodiment, failures in the transmission channel may be detected by monitoring changes in the crosstalk coupling strength metric. Monitoring may encompass acts such as measuring, calculating, in particular when using measured values and/or pre-determined values, deriving, in particular with using calculation, providing of value, comparing, for example a measured value versus a threshold value, or any other act that results in information extracted from the monitored thing or process.

In a first aspect the embodiment encompasses a method of providing a crosstalk strength matrix for use in a communication system. The communication system is to have at least a first transmission path and a second transmission path. The crosstalk strength matrix is to have at least a first coefficient value to represent crosstalk strength from the second transmission path to the first transmission path. The system is further to provide crosstalk cancelation, in a particular embodiment partial crosstalk cancelation, based on the crosstalk strength matrix. The method comprises providing an error estimate value to represent an estimated first error of signal transmission via the first transmission path. The method further comprises providing an error value to represent a second error of signal transmission via the second transmission path. Further, the method comprises updating crosstalk strength matrix coefficient values on the basis of at least the error value and the error estimate value to provide an updated crosstalk strength matrix. At least one effect of the method is to obtain a crosstalk strength matrix representative of crosstalk strength. Such crosstalk strength matrix holds information that can form a basis for determining, if the first transmission path and/or the second transmission path should be subject to future crosstalk cancelation. For example, a first matrix element with a value of least magnitude may indicate that crosstalk strength between a pair of transmission paths associated with the respective matrix element is least, and therefore crosstalk cancelation between the associated pair of transmission paths is less effective than crosstalk cancelation performed between another pair of transmission paths associated with another matrix element whose value has a larger magnitude.

In an embodiment according to the first aspect the error value represents an error of signal transmission due to signal transmission via other transmission paths, wherein signal transmitted via other transmission paths, for example, signal transmitted via the first transmission path contribute to the error value.

In an embodiment of the method in the first aspect providing the error value comprises transmitting at least one probe signal on a transmission path other than the second transmission path and, in one particular embodiment, exempted from crosstalk cancelation, receiving a measurement signal at a receiving end of the first transmission path, and, based on the measurement signal, obtaining the error value. By sending the probe signal on another transmission path, i.e., other than the second transmission path, in particular, when the another path is exempted from crosstalk cancelation, there can be uncanceled crosstalk between the another transmission path and the second transmission path. This uncanceled crosstalk may contribute to the measurement signal to form a basis for obtaining an error signal including a contribution by the signal transmitted on the another transmission path. In an embodiment, obtaining the error value is based on information about the probe signal. In an embodiment, information about the probe signal is predefined. In an embodiment, information about the probe signal is a representation of the probe signal. In an embodiment, the representation of the probe signal is compared with at least a portion or a characteristic or other descriptor of the measurement signal that matches the representation of the probe signal in kind, in order to provide an error signal. In an embodiment, the error signal is evaluated to obtain the error value.

In an embodiment of the method according the first aspect, the method is for use in the system having a plurality of transmission paths with coupling therebetween, wherein transmission paths subject to crosstalk cancelation form a current set of transmission paths that comprises the first transmission path and excludes the second transmission path. Providing the error estimate value may comprise providing a crosstalk cancelation matrix to diagonalize crosstalk amongst transmission paths in the current set of transmission paths, the crosstalk cancelation matrix having at least one off-diagonal coefficient with non-zero value. Providing the error estimate value may further comprise inverting the crosstalk cancelation matrix to obtain an inverted crosstalk cancelation matrix. Providing the error estimate value may further comprise scaling the inverted crosstalk cancelation matrix to obtain a scaled inverted crosstalk cancelation matrix with a diagonal coefficient value representing a first transmission path self-coupling being one. Providing the error estimate value may further comprise multiplying the scaled inverted crosstalk cancelation matrix with a ratio. In one embodiment, the ratio may represent carrier signal power of the at least one carrier of the second transmission path versus carrier signal power of the at least one carrier of the first transmission path. In one embodiment a square root may be formed of the ratio to be multiplied with the scaled inverted crosstalk cancelation matrix instead of the ratio itself. The wording "current" does not necessarily mean that the current crosstalk cancelation is presently active for transmission paths in the current set of transmission paths. Rather the meaning is one of not being indicative of crosstalk cancelation also being applied in a future after having established an updated set of transmission paths. In an embodiment transmission paths in the current set of transmission paths are presently subject to crosstalk cancelation while other transmission paths are presently not subject to crosstalk cancelation.

In a second aspect the embodiment encompasses a method of performing crosstalk cancelation in a communication system. In a particular embodiment the crosstalk cancelation is partial crosstalk cancelation. The system has a plurality of transmission paths with coupling therebetween. The method comprises determining current transmission error estimate for a current set of transmission paths currently subject to crosstalk cancelation, and determining current transmission error for transmission paths currently exempted from crosstalk cancelation. In one embodiment the determining of current transmission error estimate may encompass, and in one particular embodiment be limited to, reading from a memory or otherwise carrying forth predetermined transmission estimate error values. The method further comprises, based on current transmission errors and current transmission error estimates, determining an updated set of transmission paths subject to future, and in one particular embodiment to subsequent, crosstalk cancelation. In an embodiment, in the plurality of transmission paths, those transmission paths that do not belong to a first updated set of transmission paths subject to subsequent crosstalk cancelation do form a second updated set of transmission paths exempted from subsequent crosstalk cancelation.

An embodiment of the method in the second aspect comprises, before determining the updated set of transmission paths, performing crosstalk cancelation to cancel crosstalk between transmission paths of the current set of transmission paths; and, after determining the updated set of transmission paths, performing crosstalk cancelation to cancel crosstalk between transmission paths of the updated set of transmission paths. An embodiment of the method according to the second aspect comprises providing a crosstalk strength matrix having coefficients to represent pairwise coupling between pairs of transmission paths. In particular, a respective pair of transmission paths may thus being associated with the respective coefficient. The embodiment further comprises using the crosstalk strength matrix to determine the updated set of transmission paths subject to future, in particular, to subsequent crosstalk cancelation. In an embodiment, a criterion for determining the updated set of transmission paths is coupling magnitude represented by value size of the corresponding coefficient in the coupling strength matrix. In an embodiment a threshold value may be pre-determined, adapted, for example during operation in accordance with altering operational conditions, or otherwise redefined after system startup, in particular after system operation began, to provide a criterion/criteria for applying crosstalk cancelation to a pair of transmission paths. In an embodiment of the method in the second aspect the updating is performed after transmission of at least one signal representing payload data, wherein the transmission uses at least the first transmission path. In this embodiment, the updating may take place at a later point in time than system startup or system initialization. The updating may take place during runtime of the system and/or during system operation or data transmission. In an embodiment, data transmission may be interrupted on some or all transmission paths and on some or all carriers for a transmission path, if any.

An embodiment of the method according to the second aspect further comprises, on at least one transmission path, using a plurality of carriers. An embodiment further comprises, for the at least one transmission path being subject to crosstalk cancelation, providing the error value as an average error value with the average taken across at least a subset of carriers in the plurality of carriers used on the at least one transmission path. An embodiment further comprises, for the at least one transmission path being exempted from crosstalk cancelation, providing the error estimate value as an average error estimate value with the average taken across at least the subset of carriers in the plurality of carriers. In an embodiment of the method according to the second aspect the one probe signal on the second transmission path is a constant signal. In an embodiment the constant signal is not modulated. In an embodiment, the probe signal comprises a sequence of a plurality of signal sections. In one particular embodiment the signal sections are consecutive. In an embodiment the system has at least a third transmission path wherein the third transmission path is currently not subject to crosstalk cancelation. While the probe signal is transmitted via the second transmission path, another probe signal is transmitted via the third transmission path. The another probe signal transmitted on the third transmission path is orthogonal to the probe signal transmitted on the second transmission path. In an embodiment a plurality of probe signals are transmitted wherein the each probe signal is member of a set of orthogonal signals. Signals transmitted simultaneously may contribute to error measured on a receiving end of one transmission path. Orthogonal signals may enable to work out contribution of the respective orthogonal signal to the measured error. In an embodiment of the method in the second aspect the providing the crosstalk strength matrix is according to the method according to the embodiment in the first aspect.

In another aspect the embodiment encompasses optimizing power with using the method of providing the strength matrix and/or the method of providing crosstalk cancelation. In an at least one desired bit rate may be predetermined for an associated at least one transmission path and the crosstalk strength matrix may be used in order to determine at least for a subset in the plurality of transmission paths a transmit signal power for transmission of signals on the at least one transmission path so as to achieve the pre-determined bit rate on the associated at least one transmission path, respectively. In an embodiment at least one bit rate may be pre-determined for at least one carrier used on the transmission path. In an embodiment any of these steps may be performed repetitively so as to iteratively adapt signal power to attain desired bit rates on associated transmission paths and/or carriers.

In a third aspect the embodiment encompasses a processing unit for use in a communication system having a plurality of transmission paths with coupling therebetween, the processing unit to provide crosstalk strength matrix information for use in crosstalk cancelation, wherein the processing unit is adapted to perform acts of any of the methods according to the embodiment in the first, the second and/or the another aspect.

In a fourth aspect the embodiment encompasses a transmit unit for use in a communication system having a plurality of transmission paths with coupling therebetween, the transmit unit adapted to perform crosstalk compensation or in other words crosstalk cancelation, wherein the transmit unit comprises the processing unit according to the embodiment in the third aspect. In one embodiment the transmit unit is configured for co-operation with a receive unit according to the embodiment in the fifth aspect.

In a fifth aspect the embodiment encompasses a receive unit for use in a communication system having a plurality of transmission paths with coupling therebetween, wherein the receive unit is adapted to perform acts of any of the methods according to the embodiment in the first, the second and/or the another aspect. In one embodiment the receive unit is configured for co-operation with a transmit unit according to the embodiment in the fourth aspect.

In a sixth aspect the embodiment encompasses a system for communication, the system having a plurality of wireline and/or wireless transmission paths, the system comprising at least a transmit unit and a receive unit, the transmit unit to transmit signals via the plurality of transmission paths, the receive unit to receive signal at a receive end of at least a first transmission path and a second transmission path in the plurality of transmission paths, wherein the system is configured to perform crosstalk cancelation according to any of the methods according to the embodiment in the second aspect. In an embodiment the system only has wireline transmission paths. In an embodiment the system only has wireless transmission paths. In an embodiment the system has at least one wireline transmission paths and at least one wireless transmission paths. In an embodiment a path may encompass a plurality of carriers, for example multiple frequency bands such as used in ADSL, VDSL or in Bluetooth.

In a seventh aspect the embodiment encompasses a computer program product for use in a system according to the embodiment in the sixth aspect. In an embodiment the computer program product comprises instructions that, when executed in a processing unit of the system, cause performance of steps of any of the methods according to the embodiment in the first, the second and/or the another aspect.

The detailed description is described with reference to the accompanying figures. In the figures, the left-most digit(s) of a reference number identifies the figure in which the reference number first appears. The use of the same reference number in different instances in the description and the figures may indicate similar or identical items.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different instances in the description and the figures may indicate similar or identical items.

DETAILED DESCRIPTION

U.S. Publication No. 2012/0163491 and U.S. Pat. No. 8,126,042 are incorporated herein by reference in their entirety.

So-called vectoring or vectored data transmission is a technique for coordinated transmission or reception of data from a plurality of transmitters to a plurality of receivers via a plurality of communication connections in order to improve the transmission, for example to reduce the influence of crosstalk. Either transmitters or receivers are co-located.

For example, in DSL (digital subscriber line) transmission systems, for example VDSL (very high bit rate DSL) transmission systems, data may be transmitted from a central office (CO) or other provider equipment to a plurality of receivers located in different locations, for example in customer premises (CPE), via a plurality of communication lines. Crosstalk resulting from signals on different lines transmitted in the same direction, also referred to as far end crosstalk (FEXT), may result in a reduced data throughput. Through vectoring, signals transmitted over the plurality of communication lines from the central office or received via the plurality of communication lines in the central office may be processed jointly in order to reduce such crosstalk, which joint processing corresponds to the above-mentioned vectoring. In this respect, the reduction of crosstalk by coordinated transmission of signals is sometimes referred to as crosstalk pre-compensation, whereas the reduction of crosstalk through joint processing of received signals is sometimes referred to as crosstalk cancelation. The communication connections which are processed jointly are sometimes referred to as vectored group.

At the initialization of communication, a training has to be performed. Generally, for such a training pre-determined signals are transmitted via the communication connections, and an error value calculated based on the transmitted signals and the received signals are used to adapt the vectoring during training and after operation.

Figure 3:
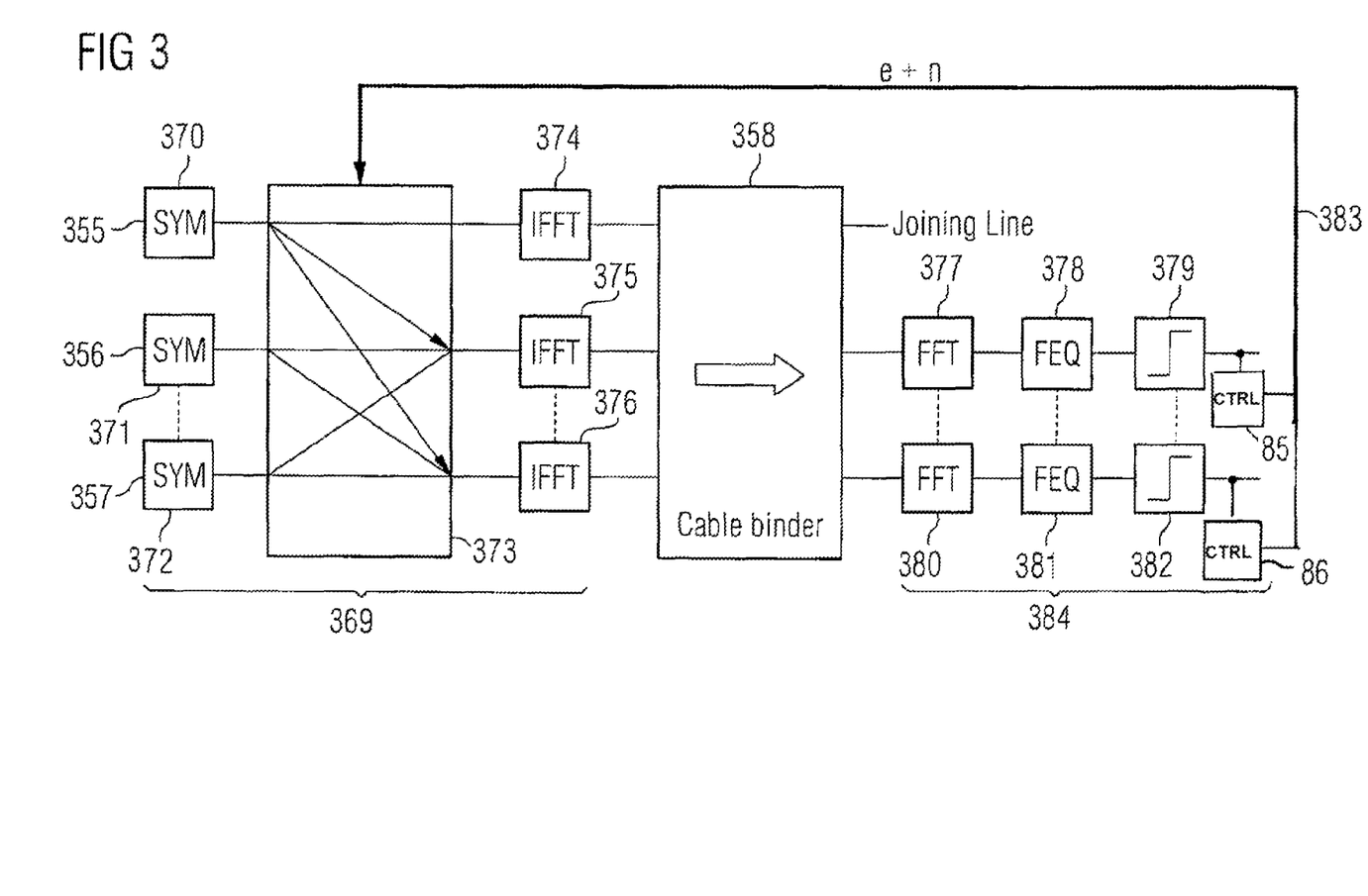
FIG. 3: Illustrates a communication system.

In FIG. 3, data is transmitted from a central office 369 via a plurality of communication lines 355, 356, 357 to a plurality of receivers in customer premises generally labeled 384. In the system of FIG. 3, the communication lines are joined in a so-called cable binder 358. Communication lines in a cable binder are usually located comparatively close to each other and are therefore prone to crosstalk. In the system shown in FIG. 3, communication lines 356 and 357 as well as further (not shown) communication line indicated by dotted lines are already incorporated in the vectored group. It should be noted that the number of communication lines in the vectored group is not limited to any particular number. Communication line 355 in the example shown is a joining line, i.e. a communication line to be added to the vectored group.

In the system of FIG. 3, a symbol mapper denoted with reference numerals 370, 371 and 372 maps data, e.g. payload or training data, onto carrier constellations which are to be transmitted via communication lines 355, 356 and 357, respectively. A crosstalk pre-compensator 373 modifies these symbol mappings in order to pre-compensate crosstalk occurring during the transmission. The such modified carrier mappings are modulated onto a plurality of carriers for each communication line, said carriers having different frequencies, and are then transferred into signals in the time domain by inverse fast Fourier transformations 374, 375 and 376, respectively.

This type of modulation, also referred to as discrete multitone modulation (DMT) is commonly used in DSL systems like VDSL systems or VDSL2 systems. The such generated signals are then transmitted via the communication line to the customer premises. The received signals are then converted into the frequency domain by fast Fourier transformers 377 and 380, respectively and equalized by frequency equalizers 378, 381, respectively before slicers 379 and 382, respectively output received constellations which, in case of an error-free transmission, correspond to input constellations generated in 371, 372 originally intended for transmission. It should be noted that also a customer premises equipment of the joining lines may have elements corresponding to the elements shown for the vectored lines like fast Fourier transformer, frequency equalizer and slicer, but these are not shown in FIG. 3. Moreover, it is to be understood that for clarity's sake only some elements of the communication devices involved are shown, and further devices like amplifiers, sampling units and the like may be present.

As already mentioned, for adapting the vectoring which is implemented in this case by crosstalk pre-compensator 373 to the joining line, synchronization symbols transmitted may be modified e.g. by Walsh-Hadamard sequences to form orthogonal pilot sequences. The synchronization symbols on all the lines may be sent in a synchronized manner, i.e. at the same time.

Via respective backchannels in the vectored lines, an error signal e is transmitted back to crosstalk precoder 373. Error signal e for the synchronization symbols is indicative of a difference between the synchronization symbols sent (which are known to the receiver since fixed sequences are used) and the symbols actually received. Based on this error signal, the crosstalk pre-compensator 373 is adapted to reduce the error, i.e. the difference between symbols sent and symbols received, by reducing the effect of crosstalk from the joining line to the vectored line.

The error signal e may for example be determined in control circuitry 85, 86 in the communication devices in the receivers 384. It should be noted that control circuitry 385, 386 need not be separate control circuitry, but may be integrated in any suitable element in the receivers, for example in a digital signal processor, which may also execute the function of other elements in the receiver like Fast Fourier transformers 377, 380, frequency equalizers 378, 381 and/or slicers 379, 382.

In the embodiment of FIG. 3, control circuitry 385, 386 additionally determine a noise indication n which is also sent back to central office 369 via back channel 383. Noise indicator n may be obtained, for example, by comparing the difference between sent and received training symbols with a pre-determined threshold or with an average value or by comparing the amplitude of signals immediately preceding or following the training symbols with a pre-determined threshold. Noise indicator n may for example be a one bit flag or multi bit value, the latter indicating not only the presence but also the magnitude of noise.

It should be noted that in systems like the above-described DSL system where for each communication connection, e.g. communication line, data is transmitted via a plurality of communication channels, e.g. carriers, the noise indicator may be provided separately for each communication channel, e.g. each carrier, or noise indicators may be provided separately for groups of communication channels, for example frequency bands comprising a plurality of carriers.

Based on the noise indicator n crosstalk pre-compensator 373 may modify the vector training, for example prolong the vector training, abort the vector training or disregard or limit error values associated with increased noise. In case separate noise indicators are provided for different carriers or groups of carriers as described above, the above measures may be taken individually for the different carriers or groups of carriers. In systems other than DSL systems, measures may be taken individually for different communication channels or groups thereof.

Figure 4:
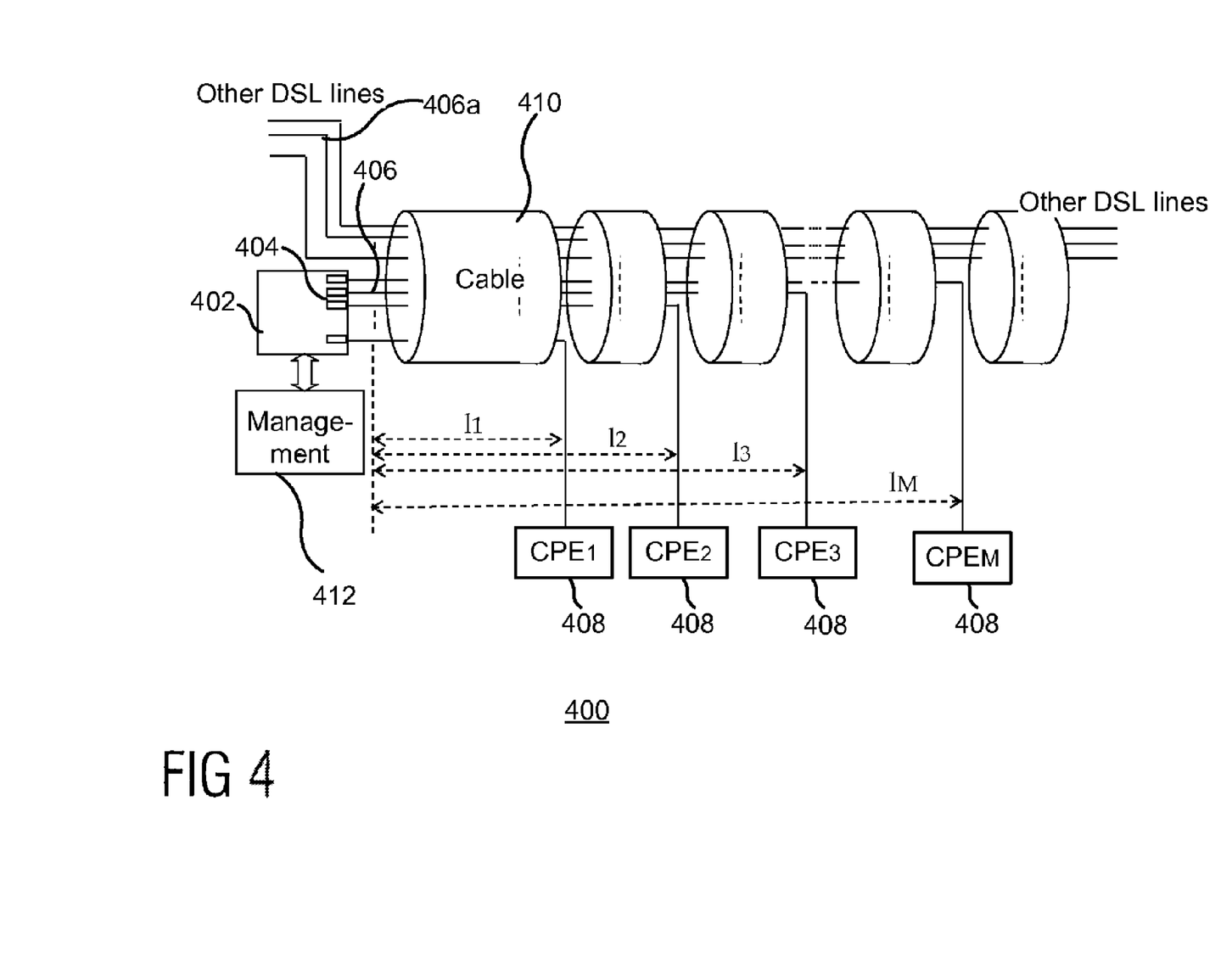
FIG. 4: Illustrates a communication system.

Referring now to FIG. 4, an embodiment of a vector transmission system 400 is shown. In the following detailed description, exemplary embodiments are described with respect to a VDSL vector transmission system. It is to be noted however that the VDSL vector transmission system is only an exemplary embodiment of a vector transmission system and that vector transmission system 400 can be of any other type. Furthermore, it is to be understood that the lines of the VDSL vector transmission system are only one representation of channels of a vector transmission system and that the described VDSL lines may be replaced in other embodiments by other communication channels.

The VDSL vector transmission system comprises a DSLAM (Digital Subscriber Line Access Multiplexer) 402 having a plurality of first transceiver units 404 which are coupled to a plurality of lines 406. Each of the lines of the plurality of lines may for example be implemented as twisted pair wire. DSLAM 402 may be implemented in an Optical Network Unit (ONU) such as a Central Office, a cabinet, an exchange or other types of network termination devices at the operator's end.

Each of the plurality of lines 406 connects the first transceiver units 404 at the operator's end with a respective second transceiver unit 408 at a subscriber end. The first transceiver units 404 are implemented to form with the second transceiver units 408 and lines 406 a vector transmission system. The second transceiver units 408 may for example be integrated in customer premise equipment such as a home gateway, a router etc. The second transceiver units 408 may be located at different distances with respect to the transceiver units 404 such that the number of lines provided in a cable bundle or cable 410 is decreasing with increasing distance from the first transceiver units 408 as shown in FIG. 4. It is however to be noted that the second transceiver units 408 may in other embodiments have a same or nearly a same distance from the first transceiver units.

At the operator's side, a management entity 412 may be provided to provide management functions such as spectrum management. As will be described later, the management entity 412 may perform also coordination functionality for transmitting FEXT probing signals.

Further lines which are not part of the vector transmission system, for example ADSL lines, SDSL lines or ISDN lines, which are designated in FIG. 4 with reference number 406a may be provided in the cable 410. As shown in FIG. 4, the further lines 406a may terminate at other operator or subscriber termination locations. For example, the VDSL line may be terminated at a cabinet while the ADSL lines may be terminated at a Central Office. According to other embodiments of the present embodiment, all of the lines provided in the cable 410 may be connected to the first transceiver units. In such embodiments, all of the lines of the cable may be transmission lines of the vector transmission system while in the embodiment shown in FIG. 4, only the lines connected to the first transceiver units 404 may be transmission lines of the vector transmission system.

Distortion of the data transmission on the vector transmission system occurs mainly by two types: distortions which are generated by the vector transmission itself (FEXT or self-FEXT) and distortions from outside of the vector transmission system also known as alien noise.

While the alien noise typically cannot be compensated, the FEXT distortions of the vector transmission system can be compensated by having knowledge of the signals, i.e. of the data transmitted over the lines of the vector transmission system.

In upstream direction all of the data send over the lines 406 terminate at one of the first transceiver units 404 of DSLAM 402. Therefore, at the receiver side, i.e. at the DSLAM, access to all data transmitted over the lines 106 can be provided.

In downstream direction, the data send over the lines 406 are received at the respective second transceiver units 408 which are typically placed at different locations. Typically, no channel between the receiving devices at the different subscriber locations is available. In this case, compensation at the subscriber's end cannot be provided as the transceiver unit 408 at one subscriber has no information of the data send to the transceiver unit 408 at another subscriber.

Compensation of the FEXT can be achieved in this case by using a technique known as pre-compensation. In pre-compensation, which is also known as preceding or pre-cancelation, the effect of crosstalk experienced by a signal during transmission is computed or estimated prior to transmitting the signal and the signal is modified based on this information for example by subtracting the calculated crosstalk from the transmission signal or adding the negation of the calculated crosstalk. Then, during the transmission, the transmission signal is exposed to the crosstalk, i.e. the crosstalk adds to the transmission signal resulting in the receiving of the original or nearly original, i.e. unmodified or nearly unmodified signal as provided at the transmitting side except of some other noise added during the transmission.

It is to be noted that the term FEXT compensation as used herein may include both the FEXT compensation at the receiver side as described above as well as to the FEXT pre-compensation at the transmitter side as described above.

In VDSL, data are transmitted using a multicarrier transmission known as DMT (discrete multitone transmission). Each of the frequency bands provided for data transmission is divided into a plurality of non-overlapping subcarriers (tones). For each subcarrier, data bits to be transmitted are represented by a complex number selected of a plurality of predefined complex numbers in a constellation space. The complex number is sometimes referred to as a constellation vector, a constellation point or a subcarrier symbol. For example, if a 4-QAM (Quadrature Amplitude Modulation) is used for subcarrier k, the complex number is selected from the predefined set of $\{1+j, 1-j, -1+j, -1-j\}$ where j is the imaginary unit. The complex number of each subcarrier is then transferred to a inverse Fourier transformation unit where a time domain representation is generated by an inverse Fourier transformation also known as DMT symbol. In the above Vector transmission system, FEXT compensation may be provided independently of the other subcarriers.

In order to provide FEXT compensation, the coefficients of matrix H(k) have to be determined or estimated. This is accomplished by transmitting a sequence of cross-coupling probe signals from the plurality of transceiver units 404 to the plurality of transceiver units 408 or from the plurality of transceiver units 408 to the plurality of transceiver units 404. Cross coupling probe signals are to be understood as signals which enable to estimate cross-coupling coefficients. The probe signals received at a transceiver unit 408 is measured and compared to a reference to determine a receive error (slicer error). The slicer error from the plurality of transceiver units 408 is then used to estimate the FEXT coupling coefficients. In embodiments, the cross-coupling probe signals are provided by a sequence of synchronization symbols (sync symbols) which in addition serve for the function of providing synchronization information (pilot signals) for the transmission system. The sequence may also be referred to as a pilot sequence or pilot signal sequence. The sync symbols (pilot symbols) can in addition be used for signaling an online reconfiguration.

In an embodiment coefficients of a crosstalk canceller device are initialized during training. In an embodiment the coefficients are—in one particular embodiment continuously—updated during operation. Training signals which are used to initialize and adapt the coefficients can be the same during training and operation. In one aspect the embodiment encompasses a crosstalk strength matrix ($E_{metric}$), for use in partial crosstalk cancelation systems. In an embodiment the crosstalk strength matrix can be used to decide whether a crosstalk coupling should be canceled or not. In an embodiment the crosstalk strength matrix can also be used for other system management functions. While, in a multicarrier system, there can be a crosstalk canceller coefficient matrix for each subcarrier of the multicarrier transmission system, in an embodiment there may only be one crosstalk strength matrix for all subcarriers of one transmission direction (upstream and downstream), or—in one embodiment—at least for a larger group of subcarriers, e.g. in a VDSL system, for each sub-band of the VDSL bands, or in a wireless LAN system, for each sub-band of the WLAN bands, if any. The crosstalk strength matrix may indicate the strength of distortion caused for example by crosstalk coupling paths.

In a conventional example a difficulty may be that distortion caused by crosstalk may essentially only be present, when a new line joins a vectored group and/or before crosstalk cancelation for the joining line starts. With crosstalk cancelation enabled, it may no longer be possible to measure crosstalk strength matrix. Conventional systems measure the part of the crosstalk strength matrix, which corresponds to the crosstalk couplings from the active lines to the joining line and from the joining line to the active lines only during training of the joining line and keeps this values of the strength matrix throughout operation.

At least one effect of embodiments in various aspects is to overcome the difficulty. In one particular embodiment updating the crosstalk strength matrix during operation achieves such effect.]

FIG. 1 illustrates a multicarrier transmission system 100 according to one aspect of this disclosure. Optimization Unit 110 is shown connected to crosstalk canceller unit 130 across export line 136. Crosstalk canceller 130, in turn, is connected to one or more modems 170. Crosstalk canceller 130 is also connected to metric measurement unit 120 across export line 132 and import line 137. Finally, metric measurement unit 120 is connected to optimization unit 110 via export line 134. Together optimization unit 110, metric measurement unit 120, modems 170 and crosstalk canceller unit 110 may define the central office (shown in FIG. 1 with reference number 190).

Likewise, one or more modems 180 which are remote from central office 190, but may be in a single or multiple locations defining remote terminal 192. Remote terminal 192 is connected to central office 190 via one or more communications links 162. Links 162 are subject to crosstalk within crosstalk channel 160.

During operation of multicarrier transmission system 100, data transmission taking place over links 162 are subject to crosstalk, limiting transmission over links 162. Crosstalk cancelation techniques may be implemented to increase transmission performance, where partial crosstalk cancelation may be used to reduce the computation effort for crosstalk cancelation. Again, during operation means, within the context of this specification, during the active crosstalk cancelation and not in a configuration or training state.

Crosstalk canceller 130 has access to signals in links 162 to perform crosstalk compensation or pre-compensation. Links 162 located in crosstalk channel 160 may use multiple carrier frequencies for transmission. The receivers located in the remote terminal, such as modems 180, report a receiver error (indicated in FIG. 1 by return arrow 162), i.e. the difference between a received signal and the corresponding symbol (slicer error). The receivers 180 may be synchronized so that it is possible to define specific symbols which were received at all receivers synchronously.

The following aspects describe implementations related to crosstalk cancelation, which takes place in cross talk canceller 130. Receiver 180, represented mathematically as i, returns an error value ($e_i^{(k)}$) for carrier tone k of multi-carrier transmission system 100. In an embodiment operation takes place in four dimensions: For example, victim line i=1 . . . L (L=number of lines); disturber line j=1 . . . L; frequency, indicated by subcarrier index k=1 . . . K (K=number of subcarriers); and time, indicated by the training symbol index t=1 . . . T (T=length of training sequence). In an embodiment the result will be the crosstalk strength matrix $E_{metrik}$ (victim lines×disturber lines), which can be an average of receiver errors taken over frequency and time.

The receiver error value ($e_i^{(k)}$) may contain residual crosstalk from un-canceled crosstalk couplings as well as noise n. In one implementation the receiver error value ($e_i^{(k)}$) can be represented mathematically by the following equation:

$$e_i^{(k)} = \sum_{j \in disturber} e_{ij}^{(k)} + n_i^{(k)}$$

where $e_{ij}^{(k)}$ is the average error ($e_{ij}^{(k)}$) that is caused from disturber j at victim i which cannot be measured directly. Depending on whether a specific FEXT coupling is canceled by crosstalk canceller 130 or not, two different methods can be used to update the metric. The updating, within the context of this specification, may not require the system to go back into configuration mode, with a result such that the crosstalk cancelation may occur during generally ongoing, or minimally interrupted, cancelation of the noise.

Metric Update for Un-Canceled Disturber Paths

To measure a specific coupling path j→i that is not canceled, the signal from disturber j could be orthogonal to signals from un-canceled crosstalkers. To measure j crosstalkers at victim i, at least j+1 orthogonal sequences could be used. In an implementation every measured disturber uses a different orthogonal sequence, whereas the not measured residual crosstalkers use a remaining sequence.

The disturber j sends the sequence of length T that is defined as $u_j = \{u_{j,t=1}, u_{j,t=2}, \ldots, u_{j,t=T}\}$. To measure the coupling ($e_{ij}$), the signal can be correlated with the disturber signal according to the following equation. In an implementation, there can, at this point, be one measurement of the receiver error $e_{i,t}^{(k)}$ per time, victim and subcarrier. Applying the equation for the orthogonal sequence of each victim j=1 . . . L, it may be possible to get the average error $|e_{ij}|$ over time for each crosstalk coupling path j→i and each subcarrier k=1 . . . K.

$$|e_{ij}| = \left| \frac{1}{T} \sum_{t=1}^{T} e_{i,t} \cdot u_{j,t} \right|$$

In one exemplary implementation only one coupling is measured at one time, the disturber j to measure may send a constant signal $u_j = \{u; u\}$ while all other disturbers send an alternating sequence $u_{i \neq j} = \{u; -u\}$ or send zero $u_{i \neq j} = \{0;0\}$. For this case, the equation to measure the error metric reduces to the following.

$$|e_{ij}^{(k)}| = \left| \frac{1}{T} \sum_{t=1}^{T} e_{i,t} \right|$$

In one implementation, used for example in training and/or in coefficient adaption during operation, sequence length T is larger or equal to, in particular, proportional to a number of lines L. However, in one implementation, in the case for a measurement of the crosstalk strength matrix, the sequence length T is larger or equal to, in particular, proportional to the number of columns of the crosstalk strength matrix plus one. In one implementation the method comprises changing orthogonal sequence value and/or length during operation.

To reduce the influence of the zero-mean noise n, the sequence length T may be increased by repeating the sequence. All elements of the error metric that correspond to un-canceled FEXT couplings may be updated sequentially. In one embodiment selected portions of the crosstalk strength matrix, in particular a selected coefficient may be derived by measurement while changing the orthogonal sequences of some, or in one particular embodiment, of all lines during operation. At least one effect may be saving computation resources that would otherwise be used if the complete strength matrix would be measured at once. One further effect may be that time can be saved when compared with performing partial measurement of the strength matrix without reconfiguration of sequence.

Metric Update for Canceled Disturber Paths

As some of the crosstalk couplings were canceled by the crosstalk canceller, the crosstalk of those couplings may not be measured using the previously described approach. For those couplings, the metric elements were calculated from the coefficients of the crosstalk canceller. In an embodiment the crosstalk strength matrix includes elements corresponding to canceled and uncanceled crosstalk couplings. In an embodiment the measurement and/or calculation method in practice gives essentially the same value for crosstalk coupling j→i, no matter if this crosstalk coupling is canceled or not. This can, for example, be achieved by certain embodiments according to the method described herein. One further method might be to stop cancelation during operation for measurement of a canceled crosstalk coupling.

A diagonalizing canceller matrix $C^{(k)}$ that compensates the channel described by the channel matrix $H^{(k)}$ where the elements in $C^{(k)}$ have a value of $c_{ij}=0$ for un-canceled crosstalk couplings is assumed. The matrix is scaled so that the diagonal elements $c_{ii}=1$. The disturber j sends with an average power $p_j^{(k)}$ at tone k. In this case, the inverse $C_{inv}^{(k)}=C^{-1(k)}$ is calculated and the remaining elements of the metric were calculated according to the following operation.

$$|e_{ij}^{(k)}| = \left| c_{inv,ij} \cdot \sqrt{\frac{p_j^{(k)}}{p_i^{(k)}}} \right|$$

In one embodiment an approximation, for example a first order approximation, of the matrix inversion, may be used instead of performing the matrix inversion, as shown above. Such approximation, for example, may be $c_{inv,ij}=-c_{ij}$ for j not equal i.

Depending on the implementation of the communication links and the crosstalk canceller, additional quantities may have to be considered to calculate the crosstalk strength from the coefficients. For multicarrier transmission systems, frequency variations of the coupling strength metric may be averaged by summing up metrics of several tones. In one embodiment the following equation may be used to calculate an arithmetic mean:

$$E_{average} = \frac{1}{K} \sum_{k=1}^{K} E^{(k)}$$

In one embodiment the quadratic mean $e_{average,ij}=\mathrm{sqrt}(1/K \text{ sum from } k=1 \text{ to } K |e_{ij}^{(k)}|^2)$ may be calculated to provide an average error.

At least one effect may be that high value in $E_{average}$ indicates a strong disturber coupling. In one embodiment that strong disturber may be preferred for compensation.

Figure 2A:
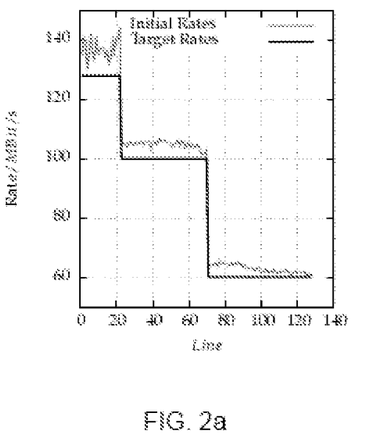
FIGS. 2(a)-(c): Illustrate data rates on slowly time-varying channel.
Figure 2B:
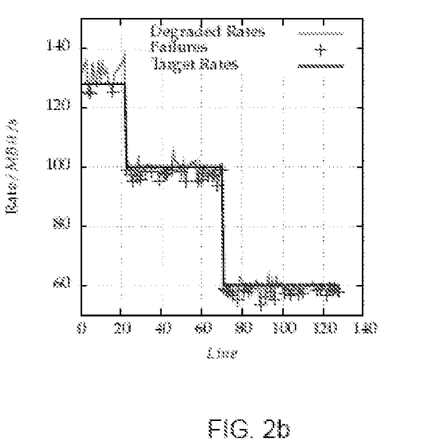
Figure 2C:
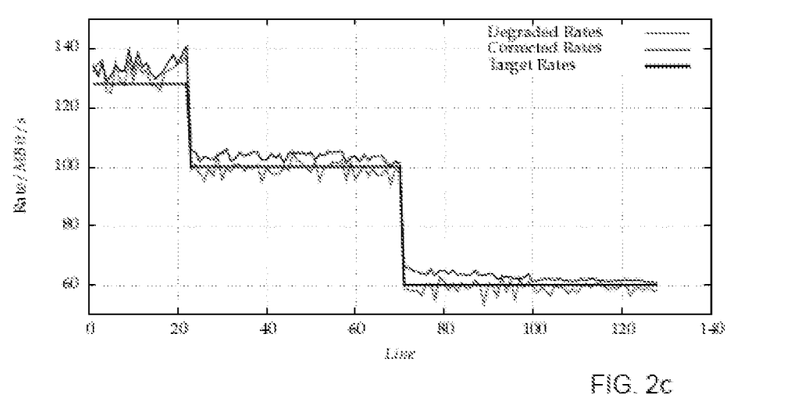

FIGS. 2(a)-(c): Illustrate data rates on slowly time-varying channel.

FIG. 2(a) is a graph showing the initial data rates and target rates. FIG. 2(b) is a graph showing the data rates after variance of transmission channel. FIG. 2(c) is a graph showing the corrected data rates after metric updates.

FIGS. 2(a)-(c) shows simulations of a VDSL2 System with partial far-end crosstalk cancelation in downstream direction. The lines have different lengths uniformly distributed between 50 m and 800 m. In the figures, the data rates were sorted starting from shortest line that gets the highest data rate until the longest line.

The resources were allocated to reach specific target data rates. FIG. 2(a) shows the target data rates and the initial data rates that were achieved on the links.

Due to the slowly time-varying channel, the data rates of the links change over time. That leads to the data rates shown in FIG. 2(b) where some of the links do no longer reach their target rates.

With an updated crosstalk coupling strength metric and an update of the selection of canceled crosstalk couplings, the links again reach the target rates, as shown in FIG. 2(c).

Crosstalk cancelation using the above can take place in a number of different systems, for example, wireless and DSL systems including Very-High-Bit-Rate Digital Subscriber Line 2 (VDSL2) system or systems following the standards ITU-T G.993.2 or G.993.1. The crosstalk cancelation described above can also take place on wireless local area network (WLAN) configuration. Furthermore, the signals can be sent over, for example, optical cables or copper cables (e.g. twisted pair) or a combination of both. In addition, provision is made for the monitoring of the crosstalk in the lines to be continuous.

For the purposes of this disclosure and the claims that follow, the terms "coupled" and "connected" have been used to describe how various elements interface. Such described interfacing of various elements may be either direct or indirect. Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. The specific features and acts described in this disclosure and variations of these specific features and acts may be implemented separately or may be combined.

In an aspect the embodiment encompasses a method of establishing a crosstalk strength matrix for use in a multicarrier communication system having at least a first transmission path (i) and a second transmission path (j), the system to use a plurality of carriers (1 ... N). The method comprises providing a first crosstalk strength matrix at least having a first coefficient having a value (ij) to represent crosstalk at least between the first transmission path and the second transmission path, for at least one carrier (1) in the plurality of carriers, providing a first error value (ij1) to represent a first average error of signal transmission on the first transmission path (caused by a signal transmitted on the second transmission path), the average to be across a subset (possibilities: 1, 2, ... N−1, N) of the carriers in the plurality of carriers; and providing a second crosstalk strength matrix comprising the first coefficient having its value (ij') updated using (the value and) the first error value. An embodiment is related to a crosstalk strength matrix ($E_{metric}$), which is for example used for partial crosstalk cancelation systems. In an embodiment, the metric is provided to decide whether a crosstalk coupling is canceled or not. In an embodiment the metric is provided for other system management functions. While in an embodiment there is a crosstalk canceler coefficient matrix for each subcarrier of a multicarrier transmission system, there is only one crosstalk strength matrix for all subcarriers of one transmission direction (upstream and downstream). In an embodiment there is only one crosstalk strength matrix for a group of subcarriers, for example, for sub-bands of the VDSL bands of one transmission direction. In an embodiment the crosstalk strength matrix indicates the strength of distortion caused by each crosstalk coupling path. In an embodiment, distortion caused by crosstalk may only be present, when another transmission path, for example, a new line joins the vectored group, and before the crosstalk cancelation for the joining line starts. In an embodiment with crosstalk cancelation enabled, it may no longer be possible to meaningfully measure crosstalk strength matrix elements to the extent transmission paths are subject to crosstalk cancelation. A system measures part of the crosstalk strength matrix, which corresponds to the crosstalk couplings from the active lines to the joining line and from the joining line to the active lines during training of the joining line and keeps this values of the strength matrix. In an aspect the embodiment encompasses a method to update a crosstalk strength matrix during operation.

Further aspects may encompass exemplary embodiments as stated below:

An embodiment provides a method of reducing crosstalk in a crosstalk cancelation system, the system comprising at least one first signal, the method comprising: applying to said at least one first signal a crosstalk cancelation according to a set of crosstalk coefficients; monitoring crosstalk received in said at least one first signal at a first end of the first path during said application of said crosstalk cancelation; and updating the crosstalk coefficients during said monitoring. In an embodiment the crosstalk cancelation occurs at the far end of a first signal line carrying the first signal. In an embodiment the crosstalk results from signals on different lines transmitted in the same direction.

An embodiment further comprises establishing at least one error signal based on said crosstalk present in said at least one first signal, wherein a metric based on the strength of the at least one error signal is established, and wherein the crosstalk coefficients are updated based on said metric. In an embodiment processing time is reduced using said metric. In an embodiment the set of crosstalk coefficients are part of a matrix used to determine the power applied to the at least one first signal. An embodiment further comprises the step of updating a portion of the coefficients. In an embodiment the system comprises at least one second and third signal, the at least one second signal being uncanceled by the crosstalk cancelation, and the at least one third signal being canceled by the crosstalk cancelation, wherein the error signal upon which the metric is based is computed differently for the at least one second signal than for the at least one third signal.

In an embodiment the crosstalk cancelation system comprises a metric measurement unit, which determines the strength of the crosstalk. In an embodiment computation of the error signal of the at least one first signal from the crosstalk of the at least one second signal is derived from a first and second sequence signal sent on the at least one first and second signal respectively, the second sequence signal having a constant value of $uj=\{u; u\}$, while the first sequence signal has a constant value of $ui \neq j=\{u; -u\}$ or $ui \neq j=\{0;0\}$. In an embodiment computation of the error signal of the at least one first signal from the crosstalk of the at least one third signal is at least partially calculated from a ratio of the average power of the at least one third signal to the average power of the first signal. In an embodiment the absolute value of the square root of the ratio is multiplied by the inverse of a strength matrix derived from the crosstalk cancelation is used to calculate the absolute of the error value of the at least one first signal from the crosstalk of the at least one third signal.

In an embodiment a Very-High-Bit-Rate Digital Subscriber Line 2 (VDSL2) system is used.

In an embodiment monitoring of said signal is continuous. In an embodiment the signal is a wireless signal. In an embodiment the signal is sent over at least one of xDSL lines and optic cables and wireless channel.

In a further aspect an embodiment is provided as a method of receiving a signal that has been crosstalk canceled, the crosstalk having been canceled by applying to said at least one first signal a crosstalk cancelation according to a set of crosstalk coefficients, monitoring crosstalk received in said at least one first signal at a first end of the first path during said application of said crosstalk cancelation; and updating the crosstalk coefficients during said monitoring.

In a further aspect an embodiment is provided as a computer software program product executing within a crosstalk cancelation system, the computer program product capable of producing crosstalk cancelation of a signal from a first communications path to a second communications path, the computer program product comprising a first executable portion capable of applying to said at least one first signal a crosstalk cancelation according to a set of crosstalk coefficients; a second executable portion capable of monitoring crosstalk received in said at least one first signal at a first end of the first path during said application of said crosstalk cancelation; a third executable portion capable of updating the crosstalk coefficients during said monitoring. In an embodiment the computer software is stored in non-volatile memory of a crosstalk canceling system. In an embodiment the non-volatile memory is ROM. In an embodiment the computer software program product is at least partially firmware.

In an aspect an embodiment is provided as a crosstalk canceling system comprising a crosstalk canceling unit that adjusts at least one first and second signals along a at least one first and second paths respectively; a monitoring unit that monitors a change in the at least one first signal due to crosstalk by the at least one second signal and producing an at least one error signal corresponding to the change; a measuring unit that receives the at least one error signal; wherein the measuring unit updates the crosstalk canceling unit when a change in crosstalk occurs while the at least one first and second signals are being adjusted. In an embodiment the crosstalk canceling unit adjusts the at least one first and second signals based on a crosstalk coefficients. In an embodiment the metric measurement unit establishes a metric based on a strength of an at least one error signal. In an embodiment the crosstalk coefficients are updated based on said metric. In an embodiment the strength of the at least one error signal upon which the metric is based is computed differently for an at least one third signal canceled by the crosstalk canceling unit than for the at least one second signal. In an embodiment of the crosstalk canceling system the metric measurement unit determines the strength of the crosstalk. In an embodiment computation of the error signal of the at least one first signal from the crosstalk of the at least one second signal is derived from a first and second sequence signal sent on the at least one first and second signal respectively, the second sequence signal having a constant of $uj=\{u; u\}$, while the first sequence signal has a constant value of $ui \neq j=\{u; -u\}$ or $ui \neq j=\{0;0\}$. In an embodiment the absolute value of the square root of the ratio is multiplied by the inverse of a strength matrix derived from the crosstalk cancelation is used to calculate the absolute error value of the at least one first signal from the crosstalk of the at least one third signal. In an embodiment the device uses at least one of wireless LAN, twisted pair or optical cables.

The invention claimed is:

1. A method of updating a crosstalk cancellation matrix for use in a communication system having at least a first transmission path and a plurality of second transmission paths, the communication system to provide crosstalk cancellation based on the crosstalk cancellation matrix, the method comprising:

providing an error estimate value to represent an estimated first part error of a signal transmission via the first transmission path due to a crosstalk from a first one of the plurality of second transmission paths to the first transmission path based on the crosstalk cancellation matrix, a transmit power on the first one of the plurality of second transmission paths and a transmit power on the first transmission path while the crosstalk from the first one of the plurality of second transmission paths to the first transmission path is subject to a crosstalk cancellation;

providing an error value to represent a second part error of the signal transmission via the first transmission path due to the crosstalk from a second one of the plurality of second transmission paths to the first transmission path while the crosstalk from the second one of the plurality of second transmission paths to the first transmission path is excluded from the crosstalk cancellation, wherein the providing the error value comprising transmitting a test signal sequence via the first communication path; and updating crosstalk cancellation matrix coefficient values on a basis of at least the error value and the error estimate value to provide an updated crosstalk cancellation matrix; and reducing the crosstalk in the communication system based on the updated crosstalk cancellation matrix.

2. The method of claim 1, wherein the providing the error value comprises:

transmitting at least one probe signal on a third one of the plurality of second transmission paths other than the first transmission path;

receiving a measurement signal at a receiving end of the first transmission path; and based on the measurement signal, and the test signal sequence obtaining a first error value.

3. The method of claim 1, wherein the providing the error estimate value comprises:

providing the crosstalk cancellation matrix to diagonalize the crosstalk among the transmission paths in a current set of transmission paths, the crosstalk cancellation matrix having at least one off-diagonal coefficient with non-zero value;

inverting the crosstalk cancellation matrix to obtain an inverted crosstalk cancellation matrix;

scaling the inverted crosstalk cancellation matrix to obtain the scaled inverted crosstalk cancellation matrix with a diagonal coefficient value representing the first transmission path self-coupling being one;

multiplying the scaled inverted crosstalk cancellation matrix with a ratio representing carrier signal power of the at least one carrier of the one of the plurality of second transmission paths versus carrier signal power of the at least one carrier of the first transmission path.

4. A method of performing a crosstalk cancellation in a communication system, the communication system having a plurality of transmission paths with disturber coupling therebetween, the method comprising:

determining a current transmission estimate error for a current set of disturber coupling currently subject to the crosstalk cancellation, wherein the determining the current transmission estimate error being based on a crosstalk cancellation matrix, and on transmit powers on at least some of the plurality of transmission paths;

determining a current transmission error for disturber couplings currently exempted from the crosstalk cancellation, wherein the determining the current transmission error comprises transmitting a test signal sequences over at least some of the plurality of transmission paths; and based on the current transmission errors and the current transmission estimate errors, determining an updated set of the plurality of transmission paths subject to future crosstalk cancellation to update the current set.

5. The method of claim 4, comprising:

before determining the updated set of the plurality of transmission paths, performing crosstalk cancellation to cancel crosstalk between transmission paths of the current set of the plurality of transmission paths; and after determining the updated set of the plurality of transmission paths, performing the crosstalk cancellation to cancel crosstalk between transmission paths of the updated set of the plurality of transmission paths.

6. The method of claim 4, the method further comprising:

providing a crosstalk strength matrix having coefficients to represent pairwise coupling between pairs of the plurality of transmission paths;

using the crosstalk strength matrix to determine the updated set of the plurality of transmission paths subject to a subsequent crosstalk cancellation.

7. The method of claim 4, wherein the updating is performed after transmission of a signal representing payload data, wherein the transmission uses at least the first transmission path.

8. The method of claim 4, the method further comprising:

on at least one the plurality of transmission paths, using a plurality of carriers; for the at least the plurality of transmission paths being subject to a crosstalk cancellation providing the error value as an average error value with the average taken across at least a subset of carriers in the plurality of carriers; and for the at least one transmission path being exempted from crosstalk cancellation providing the error estimate value as an average error estimate value with the average taken across at least the subset of carriers in the plurality of carriers.

9. The method of claim 4, wherein the one probe signal on the second transmission path is a constant signal.

10. A processor for use in a communication system having a plurality of transmission paths with coupling therebetween, the processor provide crosstalk strength matrix information for use in crosstalk cancellation wherein the processor when operated performs acts:

determining a current transmission estimate error for a current set of disturber coupling currently subject to crosstalk cancellation determining the current transmission estimate error being based on a crosstalk cancellation matrix, and on transmit powers on at least some of the plurality of transmission paths;

determining a current transmission error for disturber couplings currently exempted from the crosstalk cancellation determining the current transmission error comprising transmitting a test signal sequences over at least some of the plurality of transmission paths; and based on the current transmission errors and the current transmission estimate errors, determining an updated set of the plurality of transmission paths subject to future crosstalk cancellation to update the current set.

11. A transmit unit for use in a communication system having a plurality of transmission paths with coupling therebetween, the transmit unit adapted to perform crosstalk cancellation, wherein the transmit unit comprises the processor of claim 10.

12. A communication device for use in a communication system having a plurality of transmission paths comprising a first transmission path and a plurality of second transmission paths with coupling therebetween, wherein the communication device comprises at least one modem and a processor and is adapted to perform:

providing an error estimate value to represent an estimated first part error of signal transmission via the first transmission path of the plurality of transmission paths due to crosstalk from a first one of the second transmission paths to the first transmission path based on a crosstalk cancellation matrix, a transmit power on the first one of the second transmission paths and a transmit power on the first transmission path while the crosstalk from the first one of the second transmission paths to the first transmission path is subject to crosstalk cancellation;

providing an error value to represent a second part error of the signal transmission via a first transmission path of the plurality of transmission paths due to crosstalk from a second one of the second transmission paths to the first transmission path while the crosstalk from the another one of the second transmission paths to the first transmission path is excluded from crosstalk cancellation, wherein the providing the error value comprising transmitting a test signal sequence via the first communication path; and updating crosstalk cancellation matrix coefficient values on the basis of at least the error value and the error estimate value; and reducing crosstalk in the communication system based on the updated crosstalk cancellation matrix.

13. The communication device according to claim 12, wherein the providing act occurs during a non-training operational state of the communication device.

\* \* \* \* \*